(12) United States Patent
Wichert et al.

(10) Patent No.: US 8,947,024 B2
(45) Date of Patent: Feb. 3, 2015

(54) BATTERY OPERATED ELECTRIC MOTOR IN A WORK APPARATUS

(75) Inventors: Rene Wichert, Durlangen (DE); Gernot Liebhard, Waiblingen (DE); Rudolf Saemann, Balingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 150 days.

(21) Appl. No.: 13/523,701

(22) Filed: Jun. 14, 2012

(65) Prior Publication Data

US 2012/0319626 A1    Dec. 20, 2012

(30) Foreign Application Priority Data

Jun. 16, 2011   (DE) .......................... 10 2011 106 578

(51) Int. Cl.
*H02P 1/00* (2006.01)
*H02P 6/00* (2006.01)
*H02P 27/06* (2006.01)

(52) U.S. Cl.
CPC ........................................ *H02P 6/00* (2013.01)
USPC ...... 318/139; 318/400.15; 318/144; 318/721; 318/823; 318/801

(58) Field of Classification Search
None
See application file for complete search history.

(56) References Cited

U.S. PATENT DOCUMENTS

| | | | | |
|---|---|---|---|---|
| 3,108,192 | A * | 10/1963 | Reich ............................... | 307/66 |
| 4,549,151 | A * | 10/1985 | Kaneko .......................... | 332/110 |
| 5,490,370 | A * | 2/1996 | McNair et al. ................. | 56/11.9 |
| 5,744,921 | A * | 4/1998 | Makaran .................. | 318/400.34 |
| 2002/0014870 | A1* | 2/2002 | Krotsch et al. ............... | 318/254 |
| 2008/0136376 | A1* | 6/2008 | Nebrigic et al. .............. | 320/136 |
| 2009/0302815 | A1* | 12/2009 | Tanzawa ....................... | 323/282 |
| 2010/0218385 | A1* | 9/2010 | Mang et al. ..................... | 30/216 |
| 2010/0283332 | A1* | 11/2010 | Toukairin et al. .............. | 310/50 |
| 2010/0298983 | A1* | 11/2010 | Beste et al. ................... | 700/276 |
| 2011/0068723 | A1* | 3/2011 | Maiocchi ................... | 318/400.3 |
| 2011/0186318 | A1* | 8/2011 | Ichikawa ...................... | 173/176 |
| 2011/0227430 | A1* | 9/2011 | Omori et al. .................... | 310/50 |
| 2012/0067608 | A1* | 3/2012 | Heinzelmann et al. ........ | 173/217 |
| 2012/0191250 | A1* | 7/2012 | Iwata et al. ................... | 700/275 |
| 2013/0069613 | A1* | 3/2013 | Nakase et al. ................. | 323/284 |

* cited by examiner

*Primary Examiner* — Eduardo Colon Santana
*Assistant Examiner* — Devon Joseph
(74) *Attorney, Agent, or Firm* — Walter Ottesen P.A.

(57) ABSTRACT

An electric motor includes an arrangement of windings provided for driving the rotor, with the windings being connected to an energy source to develop torque which drives the rotor. The electric circuits of corresponding ones of the windings each have a potential point, the voltage ($U_L$, $U_G$) of which is supplied to an evaluation unit via an adaptation device. The adaptation device can be operated in two switchable adaptation stages and is connected to a drive circuit that operates in dependence upon the rotational position of the rotor. The drive circuit switches the adaptation device into the first stage having a high sensitivity or into the second stage having a low sensitivity in dependence upon the rotational position of the rotor of the motor, such that the number of required analog inputs at a microprocessor in the evaluation unit can be kept low.

17 Claims, 4 Drawing Sheets

| Rotor Position | Rotational Commutation Energization | |
|---|---|---|
| 0°(360°) | U=U+ | W=U- |
| 60° | V=U+ | W=U- |
| 120° | V=U+ | U =U- |
| 180° | W=U+ | U =U- |
| 240° | W=U+ | V =U- |
| 300° | U=U+ | V =U- |

FIG. 7

//BATTERY OPERATED ELECTRIC MOTOR IN A WORK APPARATUS

CROSS REFERENCE TO RELATED APPLICATION

This application claims priority of German patent application no. 10 2011 106 578.8, filed Jun. 16, 2011, the entire content of which is incorporated herein by reference.

FIELD OF THE INVENTION

The invention relates to an electric motor as a drive motor in a work apparatus, especially in a handheld work apparatus such as an electric chain saw, an electric hedge trimmer, an electric brushcutter, an electric blower, an electric cut-off machine or the like.

BACKGROUND OF THE INVENTION

Battery operated direct current motors are increasingly being used as a drive in handheld work apparatus such as, for example, chain saws, hedge trimmers, brushcutters, blowers, cut-off machines or the like.

In order to be able to use lightweight, high powered electric motors, a substantial electronic outlay has to be implemented. The electric motors are operated close to their maximum power range, which is why sophisticated electronic monitoring is used with which an electric overloading of the motor is avoided and equally an overloading of the power electronics is avoided. For this, a plurality of operating data of the electric motor must be captured and evaluated, usually with microprocessors. For this, each signal is supplied to an input of the processor, which is why a processor must have a plurality of, in particular, analog inputs in order to process all the signals in an adapted manner. Processors having a plurality of inputs, in particular analog inputs, are cost intensive and require a lot of space.

If electronically commutated electric motors are used, defined starting conditions must be given for starting so that the electronically commutated rotating field drives the rotor in the intended rotational direction. Defined operating conditions are also necessary when running up the motor to operating rotational speed. It must be ensured that the rotor can reliably follow the rotating field which is becoming faster. Thus, the motor can be operated during start-up by ramping up according to fixedly predetermined switching sequences. In order to ensure a reliable starting of an electronically commutated electric motor, for example position sensors are arranged which detect the rotational position of the rotor and convey the same to the electronic control unit of the motor. Thus, Hall sensors, for example, are used with which it can be ensured that the rotating field is always switched in a manner adapted to the rotational position of the rotor. If the operating rotational speed has been reached, the rotating field is controlled on the basis of the voltages induced in the motor in the field windings of the stator, whose magnitude and direction ensure a reliable control of the electronically commutated electric motor in the region of the operating rotational speed.

Aside from the generator voltage of the rotating electric motor, other operating signals are also detected, for example the load current, which can also be used for the control of the rotating field. Because the generator voltage is in the volt range and the load voltage, which is indicative of a load current, is in the millivolt range, the operating signals must be separately processed and supplied to the control unit separately.

The electronic complexity for operating an electronically commutated motor is considerable; the microprocessors used already process a multiplicity of supplied signals, which is why the use of further operating signals of the motor is often problematic or not possible without the replacement of the processor with a larger and more cost-intensive processor with more analog inputs.

SUMMARY OF THE INVENTION

It is an object of the invention to provide the operating signals which are to be evaluated for the disruption-free operation of an electric motor to the control unit of the motor with little circuit complexity.

The electric motor of the invention includes an arrangement of field windings for driving the rotor with an electric motor, wherein the field windings are successively alternately connected to an energy source in such a manner that torque acts which drives the rotor. A potential point is provided at each winding circuit chain; the voltage of the potential point is supplied to an input of an evaluation unit via an adaptation device. The adaptation device is switchable and can be operated in two adaptation stages. For switching, a drive circuit, which operates in dependence upon the rotational position of the rotor, is provided and switches the adaptation device into a first adaptation stage with high sensitivity or into a second adaptation stage with low sensitivity in dependence upon the rotational position of the rotor of the electric motor. Thus, it is ensured that the very high generator voltage of the rotating electric motor can be applied via one and the same, expediently analog, input of the evaluation unit as the load voltage which can be tapped off at the potential point in the case of load and which may be lower than the generator voltage by orders of magnitude. The potential point is—by means of the adaptation device—connected to only one analog input of the evaluation unit via only one line. As a result, a simply configured processor with only few analog inputs, which is cost effective, compact and has only low power consumption, can be used as the evaluation unit. The adaptation device is always switched from the first adaptation stage with, for example, high sensitivity into the second adaptation stage with, for example, low sensitivity when the potential at the potential point changes from the load voltage to the generator voltage. As a result of the adaptation device, which according to the invention is switched in a manner correct in terms of rotational position by the drive circuit, very different signals can be transmitted on one signal line and applied to just a single input with little circuit complexity.

For switching the adaptation device correctly in terms of rotational position in dependence upon the potential at the potential point, it is provided that the drive circuit determines the rotational position of the rotor from the signals of rotational position sensors which are arranged on the electric motor. Information about the rotational position can also come from the commutator of the electric motor, so that the drive circuit can alternatively also determine the rotational position of the rotor via the commutator of the electric motor. If in place of a mechanical rotational commutator, an electronic commutator is used, as is used in electronically commutated motors, the drive circuit can also determine the rotational position of the rotor from the control signals of the electronic commutator. Advantageously, the drive circuit is configured in such a manner that it is part of the electronic commutator or its control unit.

In a simple manner, the rotational position of the rotor can also be determined from the generator voltage tapped off at the potential point. The rotational position of the rotor can be derived from the profile of the generator voltage at the potential point. This can, for example, be done by evaluating the zero-crossings of the voltage signal. The evaluated voltage signal at one potential point of a first electric circuit (first channel) can be used to switch the adaptation devices which are connected to the other electric circuits (second and third channel) in an appropriate manner in regard to the rotational position. Thus, a rotational position appropriate control of the adaptation devices connected to the electric circuits is possible solely through suitable evaluation of the generator voltages tapped off at the potential points.

In particular, the arrangement comprises at least two windings having corresponding phase connections, wherein the phase connections of the windings are successively connected to the energy source via a commutator in such a manner that an advancing rotating field is generated. If one winding is supplied with current, the generator voltage of the rotating electric motor can be tapped off at a free phase connection of another winding. The current through the winding generating the rotating field is detected as a voltage dropped across a resistor, wherein this voltage dropped and the generator voltage are supplied to the evaluation unit as operating signals.

Advantageously, the arrangement of the field windings has three phase connections, wherein each two phase connections of the field windings are sequentially connected to the energy source via an electronically controlled commutator in such a manner that an advancing rotating field is generated. At the same time, a first phase connection is connected to the low side of the energy source via a first switching element, wherein the generator voltage of the rotating electric motor is applied at the free third phase connection. The voltage drop across one of the phase connections which connects the switching elements to the energy source can be tapped off via a phase connection, which advantageously forms a potential point, wherein these voltages are supplied to the evaluation unit as operating signals.

The operating signals, such as a load voltage and induced generator voltage, that are to be tapped off at a phase connection, are supplied to the evaluation unit via a common adaptation device, such that only one input is necessary for both operating signals. For switching the adaptation device, it is provided that when a control signal output by a control unit to the electronic commutator is present, the switching is effected from a first adaptation stage into a second adaptation stage, wherein the control signal is initiated in dependence upon the switching state of the switching elements that are arranged between the phase connections and the energy source. The use of the control signals that switch the switching elements of the commutator for switching the adaptation device can be implemented in a simple manner and ensures switching from one adaptation stage into the other, and vice versa, accurately in terms of rotational position.

The adaptation stage connected to a phase connection is switched over to the second adaptation stage when the switching elements are open. These switching elements connect the phase connection (to which the adaptation stage is connected) to the supply voltage. Since the control unit controls the switching elements, the control unit can also control the adaptation devices in a simple manner, since the signals necessary for this purpose are available anyway for operating the commutator.

In one simple embodiment, an adaptation device is formed by a voltage divider that can be switched on and off by means of a switching device. The voltage divider is present at the input of the adaptation device and is activated whenever the generator voltage of the rotating electric motor is present at the phase connection.

Advantageously, the adaptation device comprises an operational amplifier, to the analog input of which the operating signals tapped off at a potential point are applied.

In one particular development of the invention, the evaluation unit comprises a microprocessor in which the adaptation device is integrated.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
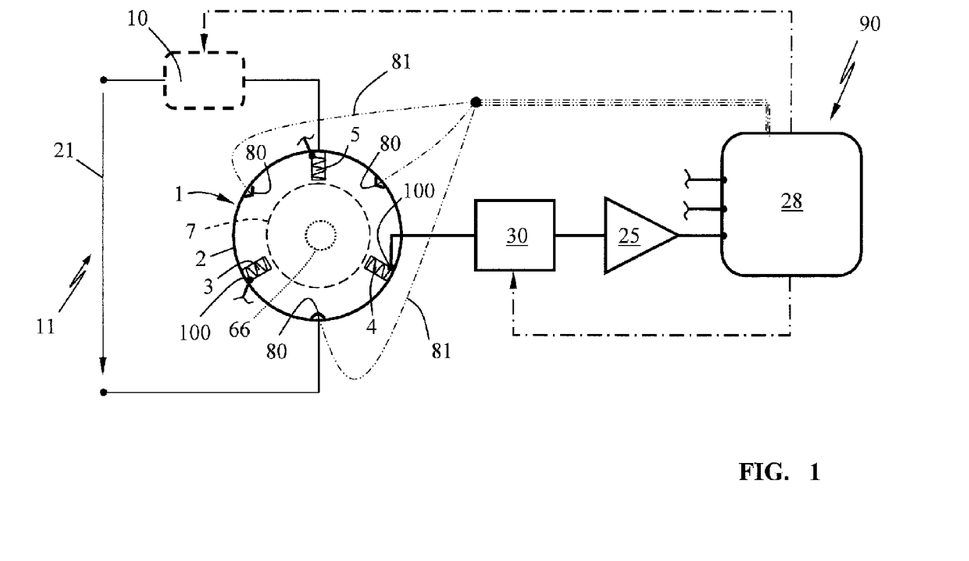
FIG. 1 is a schematic of a basic circuit diagram for evaluating the voltages present at a potential point.

FIG. 1 shows the principle of the inventive concept on the basis of a schematic. A rotor 7 rotates in a stator 2 of an electric motor 1, wherein the electric motor 1 can be a DC motor (direct current motor) with or without brushes or carbon. The energy source 11 illustrated is a battery block 60 (FIG. 2) and provides a DC voltage as supply voltage 21; a rated voltage of 36 to 42 V is expediently provided depending on the charge state of the battery block.

The stator 2 of the electric motor 1 has a plurality of windings (3, 4, 5) for generating a rotating field that exerts a driving torque 24 on the rotor 7. In one simple embodiment of a DC motor, the supply voltage 11 is applied to the windings (3, 4, 5) via a mechanical commutator 66, wherein the commutator 66 with rotation of the rotor 7 energizes only the windings assigned to the particular rotational position, as a result of which the rotor 7 is driven in the rotational direction. The current through a winding can be detected by means of a measuring resistor (shunt resistor) in each electric circuit or by means of the internal resistance of an electric switch present in the electric circuit, for which purpose the voltage dropped across it is tapped off and evaluated. For this purpose, at a suitable location, a potential point 100 is provided at the electric circuit of a winding. The load voltage $U_L$ of the potential point 100 is supplied to an evaluation unit, for example, a microprocessor 28, via an adaptation device 30—and expediently an operational amplifier 25. In the schematic, one potential point 100 is connected to the evaluation unit via the adaptation device 30; the connection of the potential points 100 of the other winding circuit chains is merely indicated.

If another winding (3, 4, 5) is not energized in a rotational position of the rotor 7, the generator voltage $U_G$ can be tapped off at the same potential point 100, the generator voltage usually being greater than the load voltage $U_L$ by a multiple.

The magnitude of the generator voltage $U_G$ is proportional to the rotational speed of the rotor 7. According to the invention, the generator voltage $U_G$ is tapped off via the potential point 100 and applied to the microprocessor 28 via the same connection as the load voltage $U_L$. The generator voltage $U_G$ is supplied to the evaluation unit, namely the microprocessor 28, via the adaptation device 30—and expediently an operational amplifier 25.

Since the voltages $U_L$ and $U_G$ tapped off at the potential point 100 differ greatly in magnitude and can be outside the voltage bandwidth of a permissible input voltage at the input of a microprocessor 28, the adaptation device 30 is provided. This adaptation device 30 advantageously operates in particular in an amplifying manner in a first adaptation stage and in an attenuating manner or with a lower or no gain in a second adaptation stage. If the relatively low load voltage $U_L$ is present, the adaptation device is operated in adaptation stage one; if the higher generator voltage $U_G$ is present, the adaptation device 30 is operated in adaptation stage two. In this way, two input signals whose value or whose amplitude differs greatly can be processed at only one analog input of a processor.

The two voltages $U_L$ and $U_G$ representing operating parameters of the electric motor 1 are tapped off at the same potential point 100, for which reason the adaptation device 30 has to be suitably controlled. Since the type of voltage tapped off at the potential point 100 (load voltage or generator voltage) is dependent on the rotational position of the rotor or on the rotational position of the driving rotating field, a drive circuit 90 is provided, which, in the exemplary embodiment shown, is formed by the microprocessor 28 or is integrated into the latter.

In one simple configuration, rotational position sensors 80, expediently Hall sensors, are arranged over the circumference of the rotor 7; in the exemplary embodiment according to FIG. 1, three Hall sensors are provided, the signal lines 81 of which are connected to the drive circuit 90. Whenever, according to the rotational position of the rotor 7, one of the windings (3, 4, 5) is deenergized and the generator voltage $U_G$ can be tapped off at the potential point 100 thereof, the drive circuit 90 passes a switching signal to the adaptation device 30, by virtue of which switching signal, the adaptation device switches to the adaptation stage two having a low sensitivity. The adapted generator signal thus lies within the input signal bandwidth of the microprocessor 28. In a manner deviating from this rotational position, a current that generates the rotating field flows, and the load voltage $U_L$ can be tapped off at the potential point 100; the drive circuit 90 switches the adaptation device 30 to the stage one having high sensitivity; the load voltage $U_L$ tapped off is advantageously amplified within the input signal bandwidth of the input of the microprocessor 28.

The drive circuit 90 can also be operated by the commutator of the electric motor 1. If a mechanical commutator 66 is used, the rotational position thereof can be sensed and the drive circuit 90 can be operated accordingly. If an electronic commutator 10 is used—for example, in the case of brushless, electronically commutated direct current motors (EC motor)—the control signals of the commutator 10 can be supplied directly to the drive circuit 90 since the control signals directly permit a statement about the rotational position of the rotor 7, as described in detail below on the basis of the example of an electronically commutated electric motor 1. By virtue of this type of control of the drive circuit 90, rotational position sensors 80 on the motor can be obviated.

The rotational position of the rotor 7 can also be determined in a simple manner by evaluating the generator voltage $U_G$ tapped off at the potential point 100. This can be done, for example, by evaluating the zero-crossings of the voltage signal, from which the instantaneous actual rotational position of the rotor 7 can be derived. In this case, the signal of the generator voltage $U_G$ at one potential point 100 of a first electric circuit (first channel) can be used to switch the adaptation devices which are connected to the other electric circuits (second and third channels) in an appropriate manner in regard to the rotational position. Thus, a rotational position appropriate for the control of the adaptation devices (30, 40, 50) is possible solely from the generator voltages $U_G$ tapped off at the potential points 100 with the adaptation devices (30, 40, 50) being connected to the electric circuits.

Figure 2:
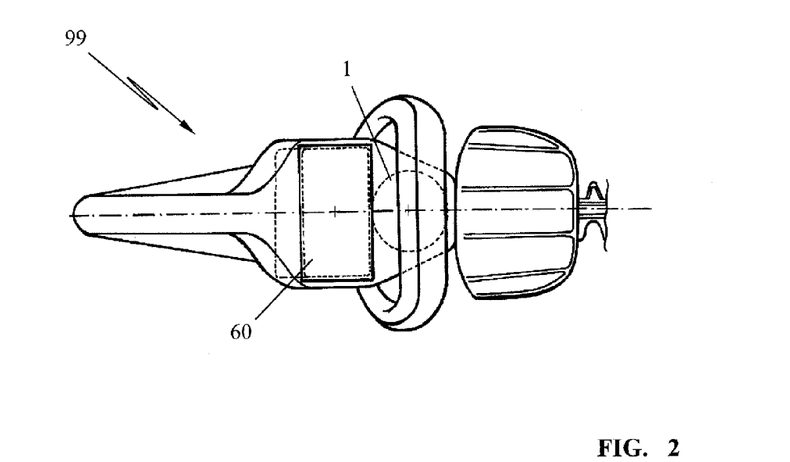
FIG. 2 is a schematic of a handheld work apparatus on the basis of the example of a hedge trimmer.

FIG. 2 shows, on the basis of the example of an electric hedge trimmer, a handheld, more particularly portable, work apparatus 99, the electric motor 1 of which is fed from a battery block 60. The work apparatus 99 shown is by way of example and could also be an electric chainsaw, an electric trimmer, an electric blower, an electric cut-off machine or the like. Handheld work apparatus is also understood to include a lawnmower or some other garden apparatus.

Figure 3:
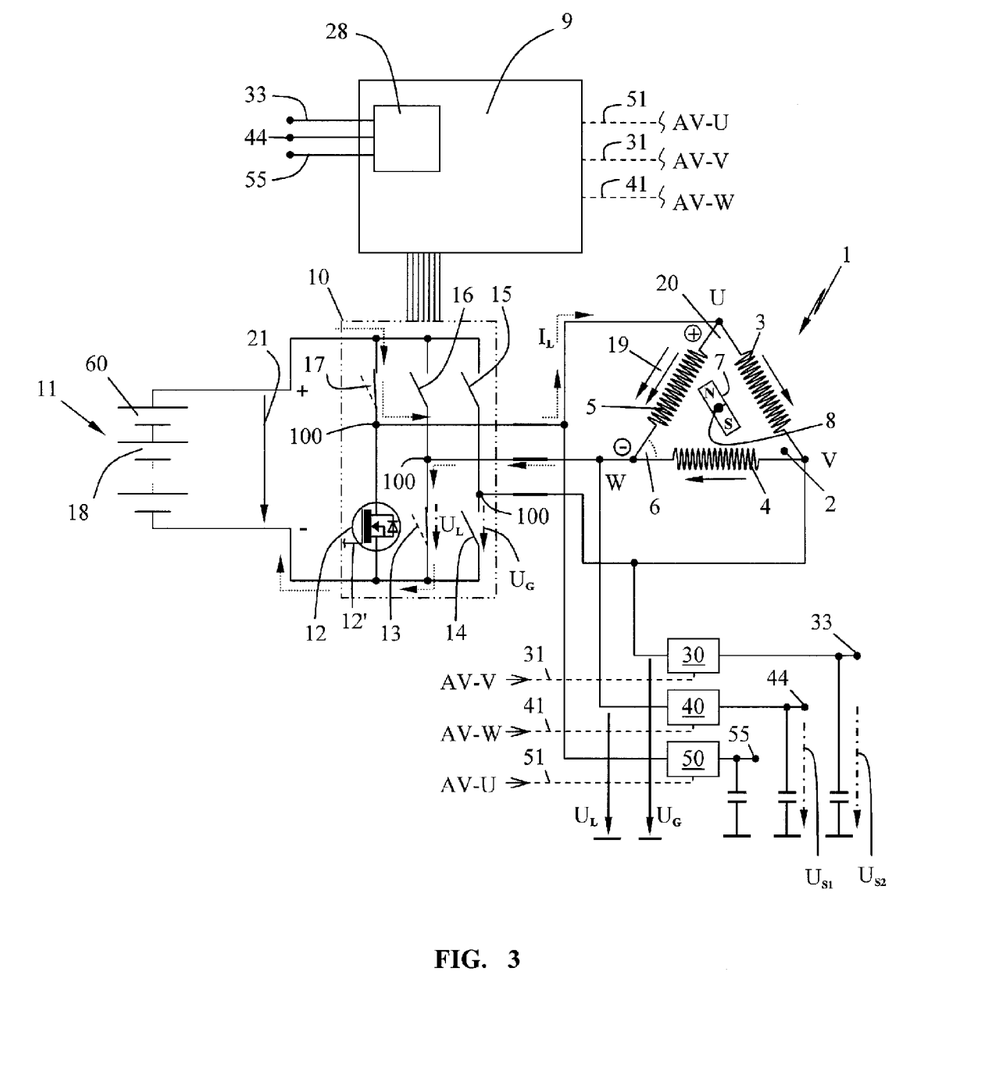
FIG. 3 is a schematic of a brushless direct current motor with a basic circuit diagram of an electronic control unit for commutation.

FIG. 3 schematically illustrates an electronically commutated electric motor 1 that forms a so-called brushless motor. An electronically commutated electric motor (EC motor) of this type consists of a stator 2 with an arrangement 20 of field windings (3, 4, 5), which are electrically interconnected with one another in a delta connection. The delta connection is mentioned by way of example; a star connection can likewise be practical.

In the exemplary embodiment shown, the field windings (3, 4, 5) are situated in a manner spatially offset with respect to one another at an angle 6 of 60°. Each two ends of the field windings (3, 4, 5) are electrically connected to one another and form respective phase connections U, V and W of the motor.

A rotor 7 is assigned to the stator 2, the rotor rotating about a rotation axis 8. In the exemplary embodiment shown, the rotor 7 is represented in an extremely simple configuration in the form of a permanent magnet having a north pole N and a south pole S. The rotor 7 can be embodied as a rotor 7 that runs in the stator 2; the rotor 7 can also be configured in a cup-shaped fashion and reach over the stator 2 with the field windings (3, 4, 5). A motor of this type is a so-called external rotor.

The electric motor 1 is supplied with voltage or current from an energy source 11 via an electronic commutator 10, wherein the energy source 11 preferably consists of a battery block 60 composed of individual cells 18 connected in series and/or in parallel. The individual cells 18 are preferably cells based chemically on lithium, for example, lithium-ion, lithium-polymer, lithium-iron or similar cells. The battery block 60 provides a DC voltage of, for example, 40 volts.

The series circuit formed by the individual cells 18 of the battery block 60 provides a supply voltage 21, namely a DC voltage, which can be stabilized by means of a voltage controller.

For electronic commutation, the phase connections U, V and W can be connected to the supply voltage 21 via respective pairs of switching elements (12, 17; 13, 16; 14, 15). As shown schematically in FIG. 3, the phase connection U is connected to the positive potential via the switching element 17 and to the negative potential of the energy source 11 via the switching element 12. Correspondingly, the phase connection W is connected to the positive potential via the switching element 16 and to the negative potential via the switching element 13. The third phase connection V is connected to the positive potential via the switching element 15 and to the negative potential of the energy source 11 via the switching element 14.

The switching elements 12 to 17 are preferably electronic switches such as, for example, MOSFETs, thyristors or similar electronic power switches. They are controlled by an electronic control unit 9, which progressively advances the rotating field formed by the field windings (3, 4, 5) of the arrangement 20 in the rotational direction of the rotor 7. In the exemplary embodiment shown, the energization of the field winding 5 is illustrated; the phase connection U is connected to the positive potential of the supply voltage 21 via the switching element 17; the phase connection W is connected to the negative potential of the supply voltage 21 via the switching element 13. As a result, a torque-forming commutator current forms in the field winding 5, this being illustrated by the double arrow 19. A current of half the magnitude flows via the two field windings 3 and 4 connected in parallel with the field winding 5, the current not constituting a greater component of the torque.

Figure 5:
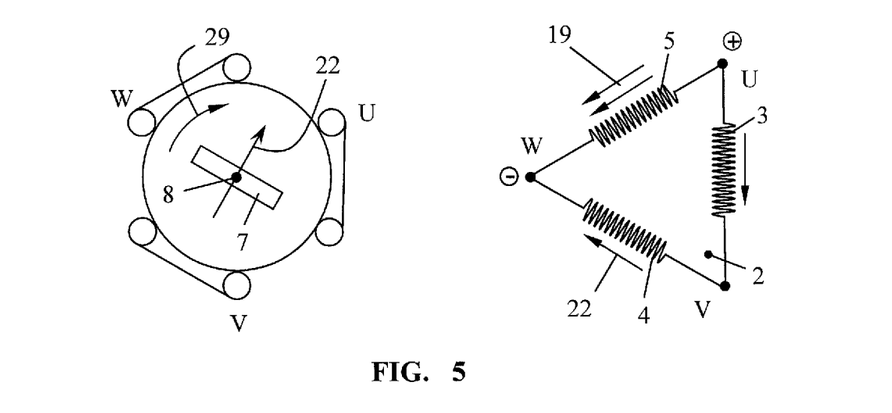
FIG. 5 is a schematic of the brushless direct current motor with commutation in a position I.

The run-up of a brushless motor to an operating rotational speed has to be effected in such a way that the magnetic rotating field of the stator current has an accelerating effect on the rotor 7. This firstly presupposes that the position of the rotor 7 with respect to the stator 2 is known at the time when the electric motor 1 is started; for this purpose, in a known manner, with the rotor 7 stationary, the inductances of the individual field winding can be measured and compared with one another. The rotational position of the rotor 7 can be determined on the basis of the results determined. If the rotational position is known, the first field winding 3, 4 or 5 corresponding to the rotational position of the rotor 7 determined is energized via the commutator 10 by means of the corresponding switching elements 12 to 17 being closed, such that the rotor 7 moves in the rotational direction 29 (FIG. 5). Corresponding to the position 0° in the table according to FIG. 7, relative to this rotor position, the supply voltage 21 is applied between the phase connections U and W of the field winding 5, as a result of which a rotating field represented by the arrow 22 in FIG. 5 builds up. The rotor 7 is driven in a manner following the rotating field in the rotational direction 29.

Figure 6:
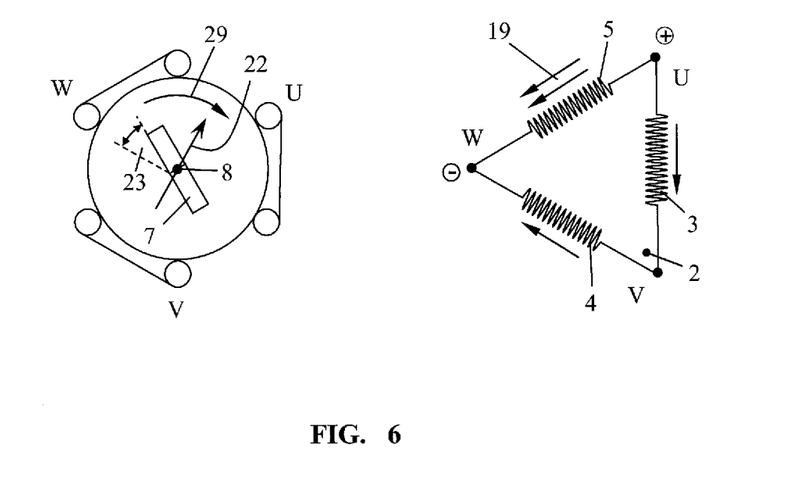
FIG. 6 is a schematic corresponding to FIG. 5 with the rotor rotated by approximately 30° in the rotational direction; and, FIG. 7 shows a table of the energization of the phase connections for rotational commutation.

In FIG. 6, the rotor 7 has moved by an angle 23 of approximately 30° in the rotational direction 29; the rotating field represented by the arrow 22 is initially unchanged, since the field winding 5 of the stator 2 is still directly energized. The further the rotor 7 rotates, the lower the driving torque of the rotating field becomes. In order to ensure a permanently driving force, therefore, the field windings have to be switched to the position 60° (table in FIG. 7) corresponding to the present position of the rotor 7 in a correctly timed manner. In a next position, the phase connection V would be connected to the positive potential of the supply voltage 21 and the phase connection W would be connected to the negative potential of the supply voltage 21. Corresponding to the energization of the phase connections U, V and W in the table in FIG. 7, the rotational commutation takes place with the result that the rotor 7 is driven by the progressively switched rotating field.

Since only two phase connections (U, V, W) of the arrangement 20 of the field windings (3, 4, 5) are ever connected to the supply voltage 21 via the corresponding switching elements 12 to 17, the switching elements assigned to the third phase are open. As shown in FIG. 3, in the case of energization of the field windings via the phase connections U and W, the phase connection V is disconnected; the switching elements 14 and 15, which are assigned to the phase connection V, are open.

On account of physical laws (law of induction), the rotating rotor induces in the field windings a voltage which can be tapped off directly at the phase connection V on account of the open switching elements 14 and 15. The amplitude of this induced voltage $U_G$ is directly proportional to the speed at which the rotor rotates and is therefore a measure of the rotational speed of the rotor 7; the profile of the induced voltage is a variable for the instantaneous rotational position of the rotor 7. This rotational speed signal in the form of the generator voltage $U_G$ is made available to the control unit 9 in order that the commutator 10 can be operated in a manner adapted in regard to the rotational speed.

The current $I_L$ flowing through the arrangement 20 brings about, in those switching elements which are closed, a voltage drop across the internal resistance thereof. This voltage drop $U_L$ can be tapped off between a phase connection and the zero potential and is directly proportional to the current $I_L$ flowing in the arrangement 20. In the exemplary embodiment, the voltage $U_L$ is tapped off at the phase connection W and corresponds to the voltage drop across the switching element 13. The voltage $U_L$ likewise serves as operating signal of the electric motor for the control unit 9 and is approximately proportional to the load. The control unit 9 uses the operating signals (generator voltage $U_G$ and load voltage $U_L$) for the adapted control of the commutator 10. For the processing of the operating signals, the control unit 9 expediently comprises a microprocessor 28.

Depending on the operating state of the electric motor 1, that is, on the rotational position of the driving rotating field and the position of the rotor 7, at each phase connection, in a first operating window, the generator voltage can be tapped off as an operating signal and, in a second operating window, the load voltage can be tapped off as an operating signal. The generator voltage $U_G$ is greater than the load voltage $U_L$ by at least a two-digit factor, for which reason, according to the invention, an adaptation device 30, 40 or 50 is provided, which is assigned to a corresponding potential point of the electric circuit of a field winding, that is, a phase connection (U, V, W) and is connected thereto. The output of the adaptation device 30 is connected to the control unit 9 via a signal line 33; correspondingly, the output of the adaptation device 40 is connected to the control unit 9 via the signal line 44 and the output of the adaptation device 50 is connected to the control unit 9 via the signal line 55.

Each adaptation device (30, 40, 50) has a first adaptation stage having a high sensitivity and a second adaptation stage having a low sensitivity. The first adaptation stage having a high sensitivity is provided for detecting and forwarding low input voltages, while the second adaptation stage having a low sensitivity serves for forwarding high input voltages. The greatly different voltages of the operating signals $U_L$ and $U_G$ can be supplied to the control unit 9 by the adaptation device 30, 40 or 50 via only one signal line or one signal connection, the control unit preferably comprising a microprocessor 28. Therefore, the microprocessor requires only one analog input for each phase connection (U, V, W).

The adaptation devices (30, 40, 50) receive corresponding ones of control signals AV-V, AV-W and AV-U from the control unit 9. Since the control unit 9 controls the commutator 10, the times in which, for example, the connection V (FIG. 3) is decoupled from the commutator 10 on account of the two open switching elements 14 and 15 are known exactly. If the phase connection V is decoupled from the commutator 10 on account of the open switching elements 14 and 15, the voltage that can be tapped off at the phase connection V is the generator voltage $U_G$. Since the generator voltage $U_G$ is higher than the load voltage $U_L$ by a multiple, the control signal AV-V is transmitted on the control line 31, the control signal switching the adaptation device 30 to the second adaptation stage having a low sensitivity. A signal $U_{S2}$ proportional to the induced voltage $U_G$ is present on the signal line 33, the signal being adapted to the permissible voltage bandwidth of the analog signal input of the microprocessor 28 in the control unit 9.

At the same time as the detection of the present generator voltage $U_G$, the potential of the phase connection W with respect to ground is detected by the adaptation device 40. The potential corresponds to the load voltage $U_L$ dropped across the switching element 13 and is a variable for the flowing load current $I_L$. Since the internal resistance of the switching element 13, in particular of an electronic power switch such as a thyristor, MOSFET or the like, is low, the voltage dropped is very small. It is in the range of millivolts and is detected by the adaptation device 40, which operates on its first adaptation stage having a high sensitivity. The first adaptation stage is present since the control signal AV-W fails to appear on the control line 41. The control signal for switching an adaptation device 30, 40 or 50 is transmitted whenever the corresponding phase connection (U, V, W) is disconnected from the supply voltage 21 via both power switches. Since the phase connection W is connected to the negative potential of the supply voltage 21 via the power switch 13, no control signal for switching the adaptation device occurs on the control line 41. The same applies to the phase connection U; the latter also remains in the first adaptation stage having a high sensitivity.

The output signal of the adaptation stage 40 on the signal line 44 is an amplified signal $U_{S1}$.

Figure 7:
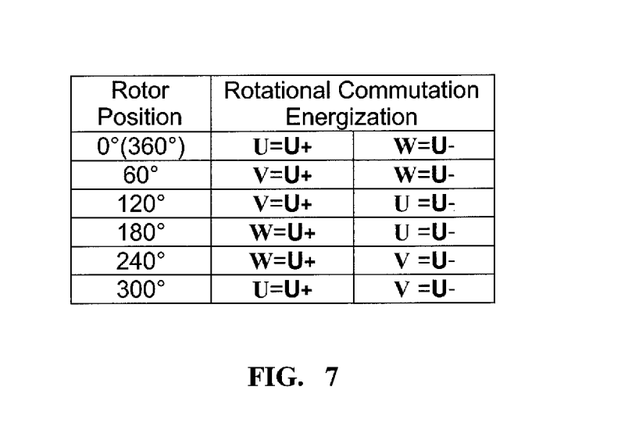

If the rotating field is advanced, in accordance with the switch positions of the commutator 10 that are then implemented on the basis of the table according to FIG. 7, the adaptation devices (30, 40, 50) are left in the first adaptation stage or—if a phase connection is completely decoupled from the supply voltage 21—switched to the second adaptation stage.

Figure 4:
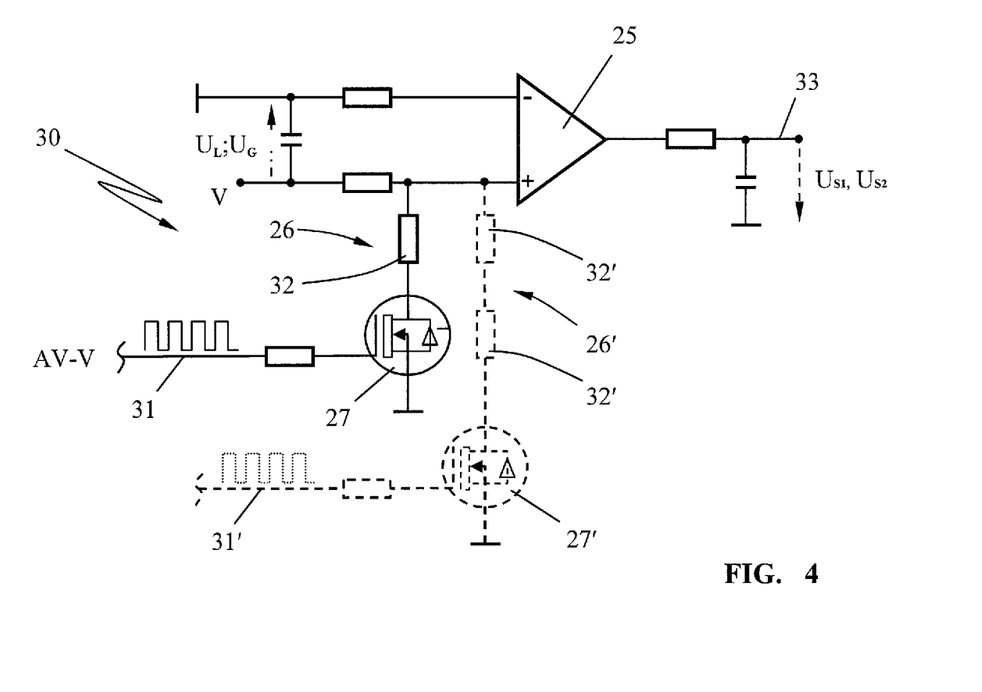
FIG. 4 is a schematic of an adaptation device on the basis of a voltage divider.

FIGS. 4 and 5 represent possible embodiments on the basis of the example of the adaptation device 30.

In the exemplary embodiment according to FIG. 4, the adaptation device 30 comprises an operational amplifier 25, across the analog inputs of which the voltages $U_L$ and $U_G$ are applied. The voltages $U_L$ and $U_G$ can be tapped off at the phase connection V. The operational amplifier 25 is configured, for example, for amplifying the load voltage $U_L$ in order to output a proportional operating signal $U_{S1}$ on the signal line 33. This corresponds to the first adaptation stage having a high sensitivity.

If the operating signal of the generator voltage $U_G$, which is higher by a multiple, is present at the phase connection V, the analog input of the operational amplifier 25 is connected to ground via a resistor 32 of a voltage divider 26. The voltage divider 26 is switched on or off via a, more particularly electronic, switch 27, wherein the electronic switch is connected to the control line 31 on which the control signal AV-V is transmitted. The control signal AV-V is present whenever the switching elements 14 and 15 assigned to the phase connection V are open, that is, the rotor 7 has a specific rotational position.

If the voltage divider 26 is switched on, this corresponds to the second adaptation stage having a low sensitivity; if the voltage divider 26 is switched off, this corresponds to the first adaptation stage having a high sensitivity. With the voltage divider 26 switched on, the operating signal $U_{S2}$ representing the generator voltage is present on the signal line 33.

In a development of the adaptation device 30, a further voltage divider 26' can be provided in parallel with the voltage divider 26, as represented by dashed lines in FIG. 4. The voltage divider 26' comprises two resistors 32', the total value of which is greater than that of the resistor 32 of the voltage divider 26. If the electronic switch 27' switches on, this corresponds to a third adaptation stage of the adaptation device 30, that is, a third sensitivity stage. In this way, a plurality of adaptation stages can be formed which are switched on and off via corresponding ones of the control lines (31, 31').

It is understood that the foregoing description is that of the preferred embodiments of the invention and that various changes and modifications may be made thereto without departing from the spirit and scope of the invention as defined in the appended claims.

What is claimed is:

1. An electric motor as a drive motor in a work apparatus having an energy source, said electric motor comprising:

a rotor defining a rotational position;

an evaluation unit having a plurality of inputs;

an arrangement of windings configured to drive said rotor;

said windings being configured to connect to the energy source in such a manner that a load current flows through said windings and a torque which drives said rotor is generated;

said windings having respective electric circuits and each of said electric circuits including a potential point whereat voltages ($U_L$, $U_G$) of different magnitude are present during operation of the electric motor;

adaptation devices connected to corresponding ones of said potential points;

said respective electric circuits each having a resistor configured for detecting said load current during operation of the electric motor;

said resistor being further configured such that said load current flowing through said resistor leads to a voltage drop across said resistor and forms a load voltage ($U_L$) corresponding to said load current;

said load voltage ($U_L$) being a first voltage of said voltages and having a magnitude in the range of millivolts;

said voltages ($U_L$, $U_G$) further include a second voltage ($U_G$) configured as a generator voltage and having a magnitude in the range of a plurality of volts;

each of said electric circuits being configured to supply said voltages ($U_L$, $U_G$) as operating signals to corresponding ones of said inputs of said evaluation unit via corresponding ones of said adaptation devices;

the voltages ($U_L$, $U_G$) of each one of said potential points being applied as said operating signals to one and the same input of said evaluation unit;

the adaptation device of each of said circuits being configured to be operable in a first adaptation stage of high sensitivity in an amplifying manner and a second adaptation stage of low sensitivity in an attenuating manner or with a lower or no gain and to be switchable between said stages;

a drive circuit for the adaptation device of each of the electric circuits;

said drive circuit being configured to operate in dependence upon the rotational position of said rotor; and, said drive circuit switching the adaptation device of each of said electric circuits into one of said first adaptation stage of high sensitivity and said second adaptation stage of low sensitivity in dependence upon said rotational position of said rotor wherein the adaptation device is switched into said first adaption stage for processing said load voltage ($U_L$) via the same input of said evaluation unit; and, the adaptation device is switched into said second adaptation stage for processing the generator voltage ($U_G$) via the same input of said evaluation unit.

2. The electric motor of claim 1 further comprising a rotational position sensor arranged on said electric motor and configured to output a rotational position signal and said rotational position being determined from said signal.

3. The electric motor of claim 1 further comprising a commutator via which said rotational position of said rotor is determined.

4. The electric motor of claim 3, wherein said commutator is an electronic commutator configured to generate control signals from which said rotational position is determined.

5. The electric motor of claim 4, wherein said drive circuit is part of said electronic commutator.

6. The electric motor of claim 1, wherein said voltage ($U_G$) is a generator voltage ($U_G$) and is tapped at said potential point and said rotational position is determined from said generator voltage ($U_G$).

7. The electric motor of claim 1 further comprising:
a commutator, wherein:
said arrangement of windings has at least two phase connections (U, V, W);
said phase connections (U, V, W) of said windings are configured to be connected to the energy source in sequence via said commutator in such a manner as to generate an advancing rotating field;
said electric motor when rotating generates said voltage ($U_G$) which is a generator voltage ($U_G$);
said generator voltage ($U_G$) is present at a free one of said phase connections (U, V, W) and the current in said winding generating said rotating field is captured as a voltage drop across a resistor; and,
said voltages ($U_L$, $U_G$) are supplied to said evaluation unit as operating signals.

8. The electric motor of claim 7, wherein said energy source has a lowside; and, a plurality of switch elements; wherein:
said commutator is an electronically controlled commutator;
said arrangement of windings has three phase connections (U, V, W) and is configured so that each two of said phase connections of the windings are connected to the energy source sequentially via said electronically controlled commutator in such a manner that an advancing rotating field is generated; and, wherein simultaneously, a first one of said phase connections (U, V, W) is connected to said lowside of said energy source via a first one of said switch elements and the generator voltage ($U_G$) of the rotating motor is present at the free third phase connection (U, V, W); to detect the current in the winding generating the rotating field, the voltage drop is tapped across one of the phase connections (U, V, W), which connects the switch element to said energy source; and, said voltages ($U_G$, $U_L$) are supplied as operating signals to said evaluation unit.

9. The electric motor of claim 8, wherein said potential point is defined by a phase connection (V, W, U).

10. The electric motor of claim 8, wherein said electric motor further comprises a control unit; and, wherein said switch elements are arranged between said phase connections (U, V, W) and said energy source; said adaptation device is switchable between said first adaptation stage and said second adaptation stage; said adaptation device is switchable from said first adaptation stage into said second adaptation stage when applying a control signal (AV-V, AV-W, AV-U) outputted by said control unit to said electronic commutator; and, said control signal is triggered in dependence upon the switching state of said switch elements.

11. The electric motor of claim 10, wherein the adaptation device, which is connected to one of said phase connections (U, V, W), is always switched to said second adaptation stage when said switch elements, which are connected to said phase connections, are connected to said adaptation device.

12. The electric motor of claim 1, wherein each of the adaptation devices is a voltage divider; and, said electric motor further comprises a switch via which said voltage divider can be switched on and off.

13. The electric motor of claim 1, wherein each of the adaptation devices includes an operational amplifier having an input; and, the voltage present on the potential point is switched onto said input.

14. The electric motor of claim 1, wherein the voltage ($U_L$, $U_G$) of the potential point is applied to the adaptation device via an analog unit.

15. The electric motor of claim 1, wherein said evaluation unit is a microprocessor and each of the adaptation devices is integrated into said microprocessor.

16. The electric motor of claim 1, wherein said energy source is a battery block.

17. The electric motor of claim 16, wherein said battery block is a chemical battery block based on lithium.

* * * * *